Dec. 4, 1923.  
J. W. BAXTER  
LICENSE PLATE  
Filed July 19, 1921  
1,476,580
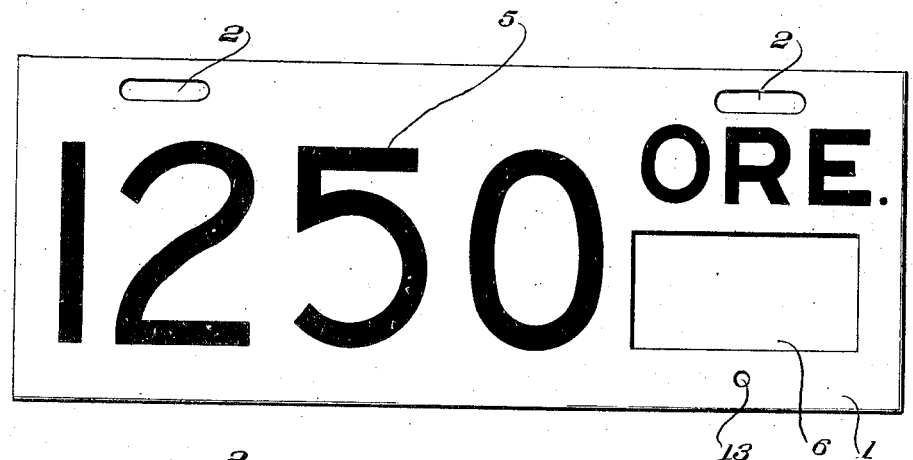
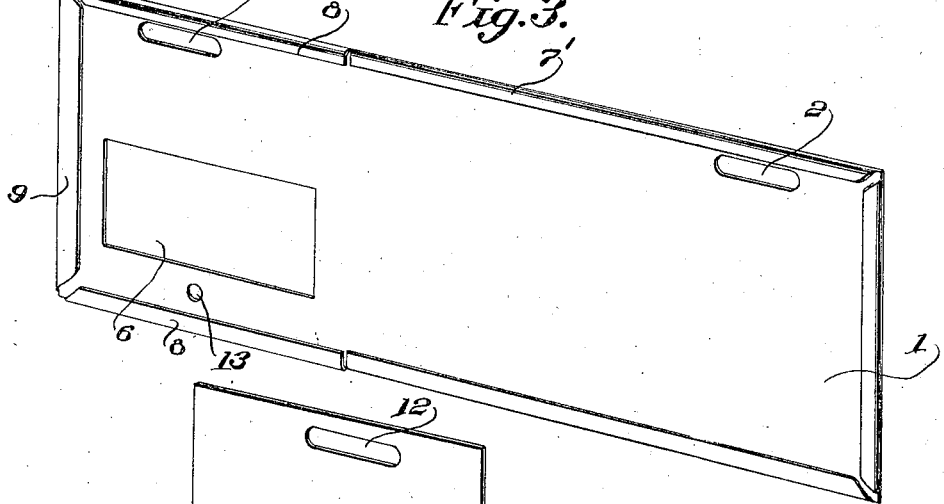
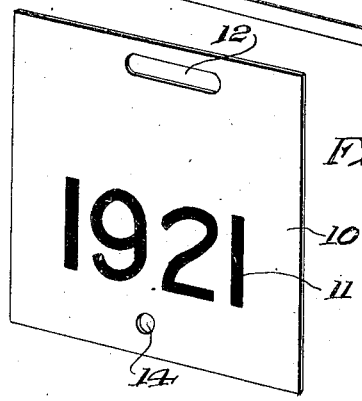
Joseph W. Baxter,
INVENTOR
BY Victor J. Evans
ATTORNEY
WITNESS:

Patented Dec. 4, 1923.

1,476,580

UNITED STATES PATENT OFFICE.

JOSEPH W. BAXTER, OF EUGENE, OREGON.

LICENSE PLATE.

Application filed July 19, 1921. Serial No. 485,810.

*To all whom it may concern:*

Be it known that I, JOSEPH W. BAXTER, a subject of England, residing at Eugene, in the county of Lane and State of Oregon, have invented new and useful Improvements in License Plates, of which the following is a specification.

At present, the license plates for automobiles, while retaining practically the same shape, are, in other respects changed yearly. The result is that considerable expense is involved each year on the issuance of new license plates to automobilists, and it is the object of this invention to produce a means whereby this expense will be materially reduced, inasmuch as the plate proper is continuously in service but has attached thereto an insert displaying data relative to a definite period of time during which the tag may be used, said insert being secured on the plate or tag by the same means which holds the tag on the car.

It is a further object to produce an automobile identification tag in which the main plate has imprinted thereon the name of the State or Territory in which the tag is issued and the license number, the said plate having slots therethrough for the means that support the plate on the body of the vehicle, and having an enlarged opening adjacent to one end thereof which is closed by an insert that has imprinted thereon the year or other period of time during which the tag may be used, said tag having suitable guideways for the reception of the insert and the said insert having a slot therethrough which aligns with one of the slots for the attaching means, whereby the insert will be held in the guides and on the tag by the said attaching means, the result being a great saving in the metal now used yearly for automobile identification tags.

With the foregoing objects in view, the improvement resides in the construction, combination and operative association of parts, such as is disclosed by the drawings which accompany and which form part of this specification.

In the drawings:—

Figure 1 is a front elevation of the automobile identification tag with the insert removed.

Figure 2 is a perspective view of the insert.

Figure 3 is a perspective view of the tag looking toward the rear thereof.

The automobile identification tag, forming the subject matter of this invention includes a substantially rectangular plate 1 of the ordinary shape and construction. The plate 1, adjacent to its upper edge and also adjacent to its ends is provided with elongated slots 2 for the means 3 that secure the tag on the automobile 4. The plate has imprinted on its outer face the license number of the tag, indicated by the numeral 5 and also the name of the State, Territory or District from which the tag is issued. The plate 1, adjacent to one of its ends is provided with a square or rectangular opening 6. The plate has both its ends and top and bottom edges bent upon themselves and turned inwardly against the back of the said plate, thus forming reinforcing portions 7. These portions 7, at one end and the top and bottom edges of the plate that are arranged adjacent the opening 6 are not brought in forcible contact with the face of the plate, but are spaced a suitable distance away therefrom, as clearly shown in Figure 2 of the drawings, the longitudinal members being cut as at 7′ from the reinforcing members proper, which I have designated by the numeral 7. These outturned portions or flanges have their longitudinal members indicated by the numeral 8 and their end member by the numeral 9. These flanges provide guideways for an insert plate 10. The insert has imprinted on the outer face thereof, as at 11, the date or year, or data relating to a definite period of time during which the tag may be used, and the said plate has adjacent to its upper edge an elongated slot 12 that is designed to register with one of the slots 2 and that is also designed to receive therethrough the securing means 3. In this manner the insert plate 10 can be readily attached to the license plate 1 and secured thereon by the same means that attach the plate to the automobile.

If desired, other means may be provided for holding the insert on the license plate, as for instance, the plate 1 and the insert plate may be provided with registering openings 13 and 14 respectively through which may pass any suitable securing means.

With my improvement, the plate and insert are given to the automobilist by the proper authorities after his application for the license. Thereafter the plate 1 remains permanently in the possession of the owner. The data, on the insert is plainly displayed through the opening in the plate and as said data relates to the period of time during which the tag may be used, the authorities can readily perceive whether the use of the tag beyond the prescribed period is attempted. The insert plate may be cheaply constructed, and upon the renewal of the license, the proper authority, instead of issuing a whole license plate merely issues the insert plate to the applicant. The applicant attaches the insert plate to the tag, as previously stated, and the result is that a great saving in material, and consequently in expenses is attained.

Having described the invention, I claim:—

An identification tag of the character described comprising an elongated plate provided with an opening adjacent one end and having its edges bent upon themselves to provide reinforcements, said longitudinally bent portions adjacent the opening being cut and spaced from the plate and the side edge adjacent the opening being likewise spaced from the plate, said spaced portions providing a guideway, an insert plate designed to be slidably secured within the guideway for indicia thereon to show through the opening for the purpose specified.

In testimony whereof I affix my signature.

JOSEPH W. BAXTER.